(12) United States Patent
Hedtke

(10) Patent No.: US 7,692,539 B2
(45) Date of Patent: Apr. 6, 2010

(54) AUTOMATED MECHANICAL INTEGRITY VERIFICATION

(75) Inventor: Robert C. Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 539 days.

(21) Appl. No.: 11/648,197

(22) Filed: Dec. 28, 2006

(65) Prior Publication Data

US 2008/0157987 A1 Jul. 3, 2008

(51) Int. Cl.
*G08B 21/00* (2006.01)
(52) U.S. Cl. .......................... 340/540; 73/756
(58) Field of Classification Search ................. 340/603, 340/540; 73/756, 753
See application file for complete search history.

(56) References Cited

U.S. PATENT DOCUMENTS

| | | | |
|---|---|---|---|
| 4,993,754 A | 2/1991 | Templin, Jr. |
| 5,481,200 A | 1/1996 | Voegele et al. |
| 5,495,768 A | 3/1996 | Louwagie et al. |
| 5,608,383 A | 3/1997 | Neil |
| 6,009,758 A | 1/2000 | Petrich et al. |
| 6,059,254 A | 5/2000 | Sundet et al. |
| 6,120,033 A | 9/2000 | Filippi et al. |
| 6,295,875 B1 | 10/2001 | Frick et al. |
| 6,424,145 B1 | 7/2002 | Woolsey et al. |
| 6,622,573 B2 | 9/2003 | Kleven |
| 6,675,655 B2 | 1/2004 | Broden et al. |
| 6,679,333 B2 | 1/2004 | York et al. |
| 6,754,601 B1 | 6/2004 | Eryurek et al. |
| 6,813,318 B1 | 11/2004 | Westfield et al. |
| 6,873,277 B1 | 3/2005 | Frick |
| 2002/0108448 A1 | 8/2002 | Behm et al. |

FOREIGN PATENT DOCUMENTS

WO WO 00/62081 A1 10/2000

OTHER PUBLICATIONS

Acroname Easier Robotics Website: http://www.acroname.com/robotics/info/articles/sharp/sharp.html Accessed: Jan. 24, 2006, pp. 1-7.
Allen-Bradley User Guide: Inductive Proximity Sensors, vol. 2, pp. 1-25.
Allen-Bradley User Guide: Ultrasonic Sensors, vol. 3, pp. 1-15.
Allen-Bradley User Guide: Capacitive Proximity Sensors, vol. 4, pp. 1-22.

*Primary Examiner*—Jeffery Hofsass
(74) *Attorney, Agent, or Firm*—Kinney & Lange, P.A.

(57) ABSTRACT

A process transmitter for sensing a process variable of a process fluid includes a process sensor, transmitter circuitry, a transmitter housing and a transmitter mounting component. The process sensor senses the process variable of the process fluid and the transmitter circuitry processes a signal from the process sensor. The transmitter housing receives the process sensor and transmitter circuitry, and the transmitter mounting component isolates the sensor or the transmitter circuitry from the process fluid or external environment. The mechanical integrity sensor validates assembly of the transmitter housing and transmitter mounting component.

17 Claims, 5 Drawing Sheets

AUTOMATED MECHANICAL INTEGRITY VERIFICATION

BACKGROUND OF THE INVENTION

This invention relates generally to process instruments used in industrial process control systems. More particularly, the present invention relates to process transmitters having mechanical integrity verification. Automated mechanical integrity verification is defined as the ability of a device to self validate its own mechanical construction or assembly. It includes verification that components are properly installed (such as tightness of electronic housing covers), verification that components are the proper material (such as wetted flange material), and verification that components are properly oriented (such as housing rotation).

Process transmitters are used to remotely monitor process variables, such as pressure, temperature or flow, of process fluids, such as petrochemicals or water. A process transmitter typically includes a sensor or transducer that produces an electrical output in response to physical changes in a process variable. For example, capacitive pressure transducers or piezoresistive pressure transducers produce an electrical signal as a function of the pressure of a process fluid. The electrical signal of the sensor is processed by the transmitter circuitry to produce an electrical output that can be monitored as an indication of the pressure of the process fluid. A process transmitter also includes electronics for either remotely monitoring the electrical output through a control loop or network at a central monitoring location such as a control room, or locally such as with an LCD screen.

In order to couple these electrical components with the process fluid, the components are contained in a housing that can be mounted to a process fluid vessel, such as a storage tank or pipeline, with process wetted components such as flanges, manifolds, diaphragms or other transmitter mounting components. It is critical that the housing and the process wetted components be properly selected and assembled for the desired application. For example, in order to survive contact with harsh or hazardous process fluids, the process wetted components must be composed of a suitable material. If improper materials are used the components could corrode, degrade and eventually fail, thus producing inaccurate results or altogether failing to function. Once the proper components are selected they need to be properly assembled to ensure functional and mechanical integrity. Improperly assembled mounting components could result in inaccurate results and safety hazards. For example, improperly seated covers on process transmitter housings may prevent the crucial flame-quenching threading from containing sparks, or tiny explosions therefrom, from spreading to the outside environment. Additionally, improperly threaded covers allow moisture or other contaminants into the process transmitter housing. Process flanges of differing materials and properties look similar and can be difficult to visually distinguish. Due to the risks involved, it is not adequate to rely on transient solutions such as labels to prevent the installation of improper components. Likewise, covers that are not fully threaded are difficult to detect and visual inspection cannot be fully relied upon. Therefore, there is a need for improved means of verifying that process transmitters are properly assembled.

BRIEF SUMMARY OF THE INVENTION

The present invention is directed toward a process transmitter having a mechanical integrity sensor. The process transmitter senses a process variable of a process fluid and includes a process sensor, transmitter circuitry, a transmitter housing and a transmitter mounting component. The process sensor senses the process variable of the process fluid and the transmitter circuitry processes a signal from the process sensor. The transmitter housing receives the process sensor and transmitter circuitry, and the transmitter mounting component isolates the sensor or the transmitter circuitry from the process fluid or external environment. The mechanical integrity sensor validates assembly of the transmitter housing and transmitter mounting component.

DETAILED DESCRIPTION

Figure 1:
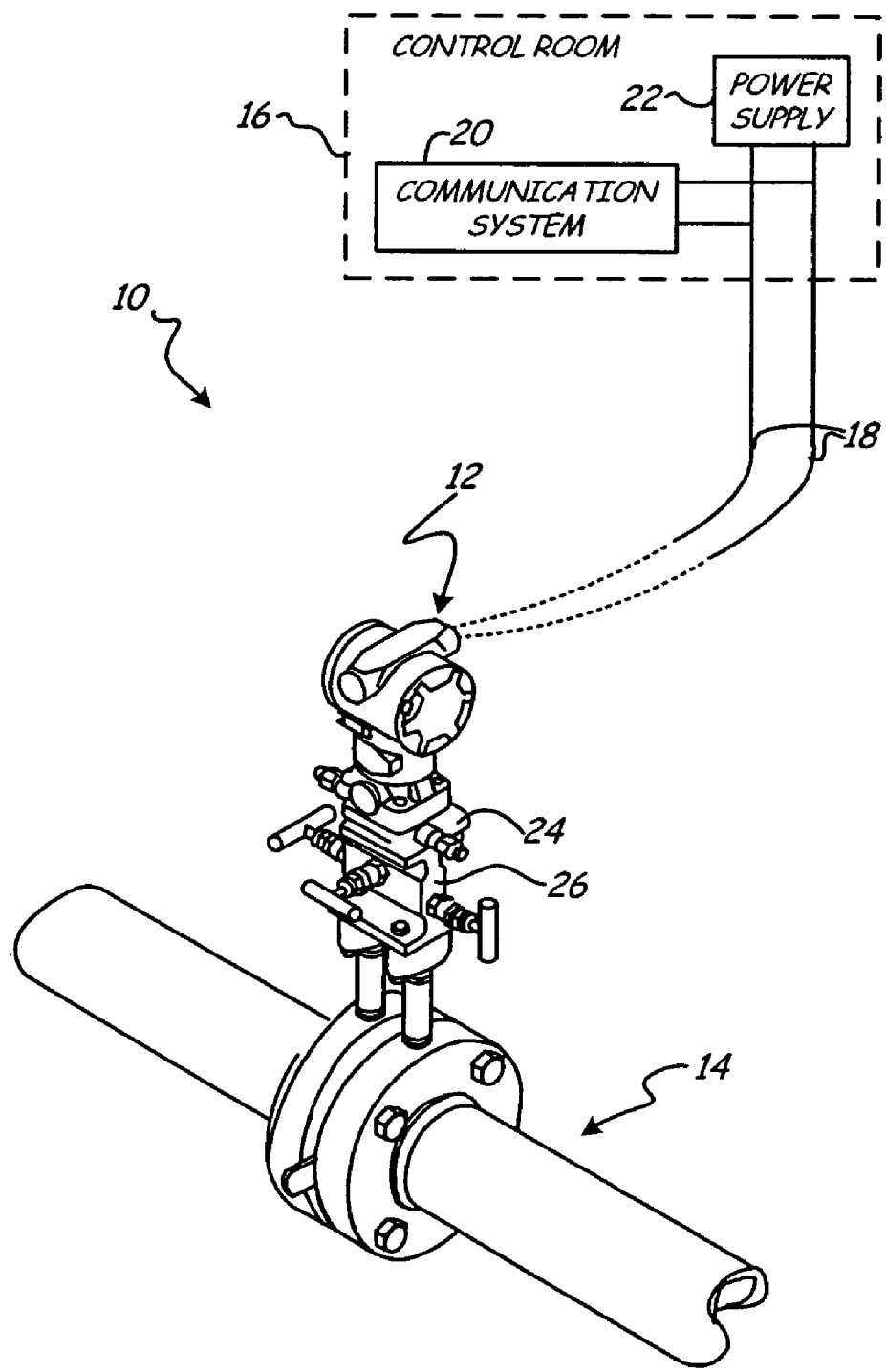
FIG. 1 shows a process control system in which a process transmitter of the present invention is used.

FIG. 1 shows process control system 10 in which process transmitter 12 of the present invention is used. Although described using a process pressure transmitter, the invention is applicable to all field mounted process devices such as temperature, flow, and level transmitters. Process control system 10 includes process transmitter 12, pipeline 14, control room 16 and control loop 18. Control room 16 includes communication system 20 and power supply 22. In this embodiment, process transmitter 12 is coupled with piping 14, in which a process fluid flows, through coplanar process flange 24 and manifold 26. Process transmitter 12 includes a process sensor and transmitter circuitry for generating an electrical signal based on a sensed process variable, such as temperature, pressure, flow or fluid level, of the process fluid. In the embodiment described hereinafter, process transmitter 12 comprises a pressure transmitter, however, the present invention is applicable to various types of process transmitters.

Process transmitter 12 also includes other electrical components for transmitting the electrical signal over control loop 18 to control room 16 or a local display such as an LCD screen, or both.

In one embodiment, process transmitter 12 is a two-wire transmitter for operating on a 4-20 mA loop. In such an embodiment, control loop 18 includes a pair of wires for supplying power to process transmitter 12 from power supply 22. Control loop 18 also enables control room 16 to transmit data to and receive data from process transmitter 12 utilizing communication system 20. Typically, a 4 mA DC current provides sufficient energy for operating the sensor and transmitter circuitry of process transmitter 12 and any local display. In other embodiments, process transmitter 12 communicates with control room 16 over a wireless network.

In order to protect the operation of transmitter 12 from operating environment conditions, such as water or contaminants, and for other safety concerns, the process sensor and electrical components of transmitter 12 are enclosed in a transmitter housing between a pair of transmitter covers. Additionally, transmitter 12 is connected to the process fluid source, e.g. pipeline 14, through process flange 24. In order to ensure that transmitter 12 is properly assembled with mounting components such as the housing, the covers and the process flange, and that the operation of transmitter 12 is adequately protected, process transmitter 12 includes at least one mechanical integrity sensor.

Figure 2:
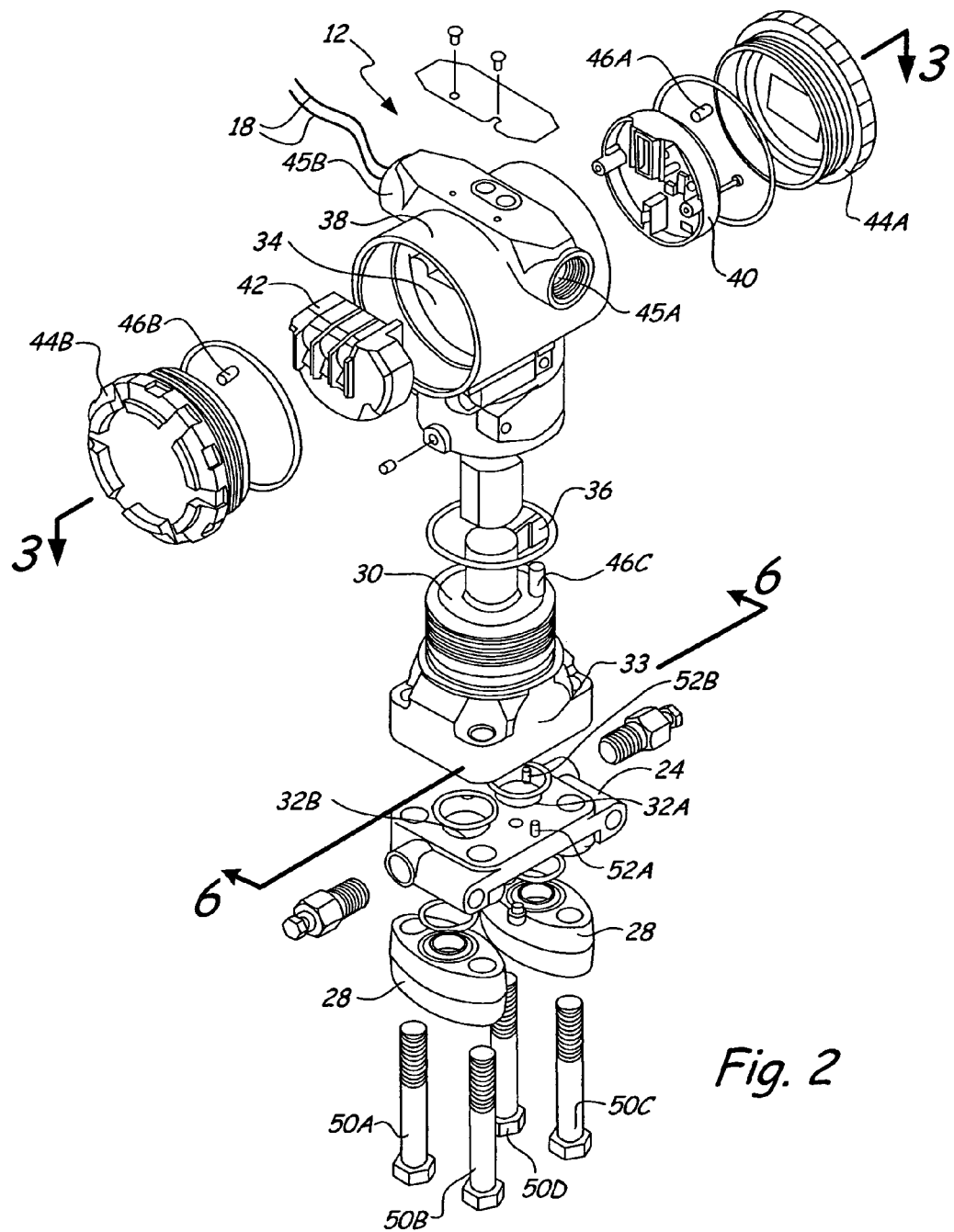
FIG. 2 shows an exploded view of the process transmitter of FIG. 1 showing the location of various mechanical integrity sensors of the present invention.

FIG. 2 shows an exploded view of one embodiment of process transmitter 12 of FIG. 1. Process transmitter 12 is configured for measuring pressure of the process fluid of pipeline 14, and is in fluid communication with the process fluid through coplanar process flange 24, and other additional mounting components, such as flange adapters 28. Manifold 26 (FIG. 1) may also be installed between process flange 24 and flange adapters 28. Coplanar flange 24 communicates the pressure of the process fluid to transmitter flange 33 through bores 32A and 32B. Transmitter flange 33 includes a pair of flexible diaphragms (not shown) that are in fluid communication with a pressure sensor inside module 30. Module 30 also includes electronic circuitry for producing a pressure signal for transmission to transmitter hub 34 through cable 36. Hub 34 is positioned inside housing 38 of transmitter 12, along with transmitter circuitry 40 and other electrical components, such as terminal 42. Hub 34 provides a platform onto which components such as circuitry 40 can be anchored inside housing 38. Circuitry 40 generates an output based on the sensed process variable of the sensor within module 30, and transmits the output to control room 16 over control loop 18, a local display situated in circuitry 40, or both. Terminal 42 and circuitry 40 are sealed within access openings of housing 38 with covers 44A and 44B and sensor module 30.

Transmitter housing 38 preferably includes covers 44A and 44B that provide a repeatable and resealable entry into transmitter housing 38 for accessing circuitry 40 and terminal 42. Additionally, control loop 18 is brought into housing 38 through conduit connections 45A and 45B. Conduit connections 45A and 45B are sealed around control loop 18 in order to isolate circuitry 40 and terminal 42 within housing 38 at connections 45A and 45B. Covers 44A and 44B are typically threaded onto housing 38 to prevent water or other contaminants from entering transmitter 12. Covers 44A and 44B also perform flame-quenching functions when properly seated. For example, covers 44A and 44B are typically threaded onto housing 38 by at least seven threaded engagements such that any flames, sparks, or explosions inside of transmitter 12 will be quenched by the thread engagements, thus containing the energy. Likewise, in wireless transmitter embodiments, conduit connections 45A and 45B are similarly plugged and sealed. Thus, safe installation of transmitter 12 depends on the proper installation of mounting components such as covers 45A and 45B, which is sometimes difficult to detect visually. Therefore, transmitter 12 includes mechanical integrity sensors 46A, 46B and 46C for ensuring proper seating of transmitter mounting components such as covers 44A and 44B, sensor module 30 and housing 38. Specifically, mechanical integrity sensors 46A and 46B ensure proper seating of covers 44A and 44B, respectively. Sensor 46A is positioned between circuitry 40 and cover 44A, and sensor 46B is positioned between terminal 42 and cover 44B. In other embodiments of the invention, transmitter 12 includes mechanical integrity sensor 46C for sensing the proper connection between housing 38 and sensor module 30.

Sensor module 30 includes transmitter flange 33, and process transmitter 12 includes fasteners 50A-50D for joining process flange 24 with transmitter flange 33. Process flange includes bores 32A and 32B that are in contact with the process fluid through flange adapters 28. Transmitter flange 33 includes internal passageways (not shown) that are filled with a fill fluid and isolated from bores 32A and 32B by a pair of flexible diaphragms (not shown) such that they communicate the process variable to the sensor of sensor module 30. Sensor module 30 thereby produces an electrical output based on the sensed process variable that is relayed and processed by circuitry 40 before being transmitted to control room 16 or a local LCD.

Process flange 24 and the diaphragms of transmitter flange 33 are in direct contact with the process fluid, and are, therefore, exposed to any potential hazards presented by the process fluid. For example, some process fluids are highly corrosive and can deteriorate materials not suitable for operating in such environments. Low grade steels, for example, may be suitable for operating in some environments, but not for corrosive environments where higher grade materials are more appropriate. Thus, it is necessary for some applications that process flange 24 and the process diaphragms be fabricated from highly corrosion resistant materials, such as Hastelloy. It is, however, difficult to visually distinguish between different grades of materials used to produce process flange 24 and the diaphragms of transmitter flange 33. One cannot, therefore, rely of labeling or packaging as a preferred method for detecting proper material. Flanges and diaphragms are made of various materials that often look the same but are marked or packaged differently. Since the same vendor makes many of the similar parts, marking can be prone to error. Likewise, casting features into the materials to make them more readily identifiable would also be prone to error. The surest way to identify proper material of components is to analyze the base material itself. Transmitter 12, therefore, preferably includes mechanical integrity sensor 52A for verifying the material of process flange 24. Likewise, mechanical integrity sensor 52B is included to verify the material of the diaphragm of transmitter flange 33. Sensor 52A is positioned between transmitter flange 33 and process flange 24, and sensor 52B is positioned near one of the diaphragms of transmitter flange 33 above one of bores 32A and 32B. Thus, installation of transmitter 12 in conjunction with mounting components unsuited for a particular application is readily detected.

Figure 3:
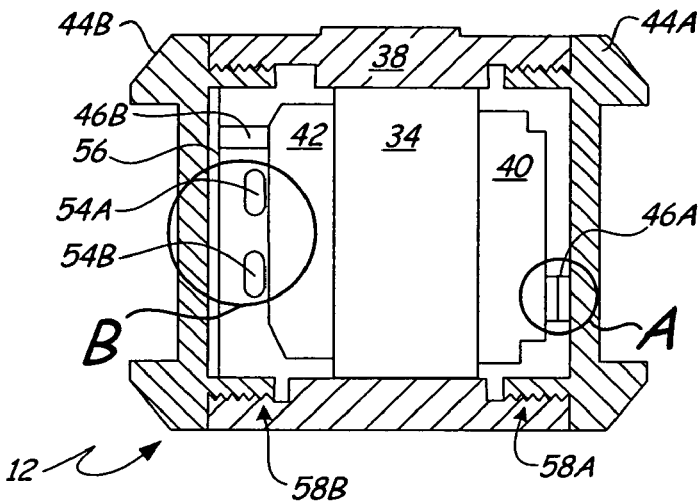
FIG. 3 shows a cross-section of an assembled process transmitter of FIG. 2 showing the position of various mechanical integrity sensors.

FIG. 3 shows a cross sectional view of an assembled process transmitter 12 as taken along section 3-3 of FIG. 2. FIG. 3 shows a view looking down into transmitter housing 38. Transmitter 12 includes hub 34, housing 38, transmitter circuitry 40, terminal 42, covers 44A and 44B, mechanical integrity sensors 46A and 46B, terminal screws 54A and 54B and sensor material 56.

Transmitter circuitry 40 and terminal 42 are connected with hub 34 inside housing 38. Hub 34 anchors circuitry 40 and terminal 42 inside housing 38 so that they can be linked to sensor module 30 and control room 16. The sensor of sensor module 30 is connected with the process fluid, through process flange 24 and transmitter flange 33, such that a signal representing the sensed process pressure can be generated. Sensor module 30 is also connected with circuitry 40 such that the signal can be further processed and manipulated. Circuitry 40 is linked with control room 16 through terminal 42 and control loop 18 such that the signal can be further processed and monitored. In other embodiments, circuitry 40 is connected to control room 16 with a wireless system. Control loop 18 is connected with terminal 42 through terminal screws 54A and 54B. Terminal screws 54A and 54B comprise fasteners that mechanically and electrically couple wires comprising control loop 18 to terminal 42.

In order to isolate electrical components of transmitter 12, such as circuitry 40 and terminal 42, from their external operating environment, covers 44A and 44B are threaded onto housing 38 at threaded interfaces 58A and 58B. Threaded interfaces 58A and 58B provide flame-quenching functions such that any spark inside housing 38 or flame resulting there from will be extinguished before it is able to escape housing 38 through threaded interfaces 58A and 58B. Additionally, covers 44A and 44B prevent moisture and contaminants from entering housing 38. The flame-quenching and environmental barrier functions performed by covers 44A and 44B are important elements in operating process control system 10 in a safe and effective manner. Additionally, sensor module 30 is tightly threaded onto housing 38 to further protect circuitry 40 and terminal 42. In order to ensure that covers 44A and 44B are properly seated, and therefore able to perform their intended functions properly, process transmitter 12 is provided with mechanical integrity sensors 46A and 46B. Mechanical integrity sensor 46C is also provided to ensure sensor module 30 is properly seated with housing 38.

Mechanical integrity sensors 46A and 46B are positioned such that they are able to interact with covers 44A and 44B, respectively. In one embodiment, sensor 46A is positioned on circuitry 40 such that it is able to contact cover 44A, and sensor 46B is positioned on terminal 42 such that it is able to contact cover 44B. Sensor 46A is thus able to detect the presence and proper installation of cover 44A, and sensor 46B is able to detect the presence and proper installation of cover 44B. In addition to mechanical integrity sensors 46A and 46B, terminal screws 54A and 54B, along with sensor material 56, can be configured to function as an additional mechanical integrity sensor for detecting the presence and installation of cover 44B. Mechanical integrity sensors 46A, 46B and 46C are electrically connected with circuitry 40 and/or control room 16 such that processes and calculations for determining the presence and tightness (closeness) of covers 44A and 44B and housing 38 can be carried out based on output of each sensor.

Figure 4A:
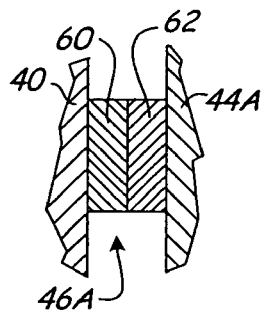
FIG. 4A shows a broken out view a first embodiment of the process transmitter of FIG. 3 in which the mechanical integrity sensor comprises a magnetometer.

FIG. 4A shows a close-up view of one embodiment of mechanical integrity sensor 46A as positioned between cover 44A and circuitry 40 and called out at detail A in FIG. 3. In a first embodiment, sensor 46A comprises magnetometer 60 and magnet 62. Magnetometer 60 is attached to circuitry 40 and magnet 62 is attached to cover 44A such that when cover 44A is properly threaded onto housing 38, magnetometer 60 and magnet 62 align. Magnetometer 60 and magnet 62 can be touching as shown in FIG. 4A, or can include a small gap between them. Magnetometer 60 senses the presence of a magnetic field, such as one generated by magnet 62. In one embodiment, magnetometer 60 comprises a Hall Effect switch, which detects the presence of a magnetic field generated by magnet 62. In another embodiment, magnetometer 60 comprises a Hall Effect sensor, which produces a voltage proportional to the magnetic field generated by magnet 62. A Hall Effect switch or sensor is typically combined into an integrated circuit that includes a Hall sensing element, a linear amplifier, and an output circuit. When cover 44A is properly threaded with housing 38, magnetometer will sense the Hall effect of magnet 62 and produce a signal. The signal generated by magnetometer 60 can be amplified and relayed to circuitry 40, whereby calculations determining the presence of cover 44A can be carried out either at circuitry 40 or control room 16. For example, circuitry 40 or control room 16 can include stored data including predetermined proximity values relating the magnitude of the Hall Effect that should be sensed if cover 44A is threaded properly onto housing 38. The sensed Hall Effect can then be compared to the stored data to determine if cover 44 is seated properly. A weak signal indicates cover 44A is present, but not properly seated and no signal indicates cover 44A is missing. If circuitry 40 determines an incorrect signal, an audio or visual alarm can be annunciated to a user either at control room 16 or at a local LCD display on circuitry 40.

Figure 4B:
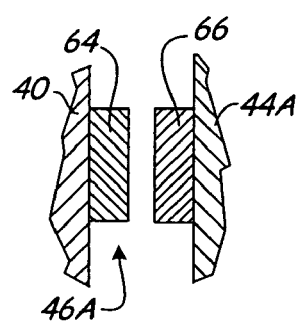
FIG. 4B shows a broken out view of a second embodiment of the process transmitter of FIG. 3 in which the mechanical integrity sensor comprises an ultrasonic sensor.

FIG. 4B shows a close-up view of another embodiment of mechanical integrity sensor 46A as positioned between cover 44A and circuitry 40. In a second embodiment, sensor 46A comprises ultrasonic sensor 64 and reflector 66. Ultrasonic sensor 64 is attached to circuitry 40 and reflector 66 is attached to cover 44A. Ultrasonic sensor 64 detects objects by emitting bursts of high-frequency sound waves that reflect or "echo" from a target. Ultrasonic sensor 64 senses the distance to a target, such as reflector 66, by measuring the time required for the echo to return to sensor 64 based on the known speed of the ultrasonic echo. Any object of any shape and material that can sufficiently reflect an ultrasonic pulse can be detected. Thus, cover 44A alone can be detected, or reflector 66 can be added to enhance the repeatability of the measurement. Reflector 66 comprises a material that increases the reflectability of cover 44A and typically comprises a very hard and smooth material, such as glass or ceramic tile. In one embodiment, ultrasonic sensor 64 comprises an analogue device that produces an output voltage proportional to the distance from sensor 64 to the target, such as reflector 66 or cover 44A. Thus, when cover 44A is missing no signal would be generated, and when cover 44A is fully threaded a full signal would be generated, with varying signal degrees in between. In another embodiment, ultrasonic sensor 64 comprises a digital device that produces a digital or discrete output that changes its output state if the distance between sensor 64 and the target is larger than a pre-set threshold. The output of sensor 64 is relayed to circuitry 40 where additional circuitry can be located to perform analysis of the output signal of sensor 64 to determine the presence or position of cover 44A. Circuitry 40 may preferably include stored data containing the predetermined time it takes for an ultrasonic echo to bounce back from a properly installed cover 44A. Circuitry 40 can then compare calculated times generated with sensor 64 to the stored data to check for proper installation of cover 44A. If circuitry 40 determines an incorrect match, an audio or visual alarm can be annunciated to a user either at control room 16 or a local LCD display in circuitry 40.

Figure 4C:
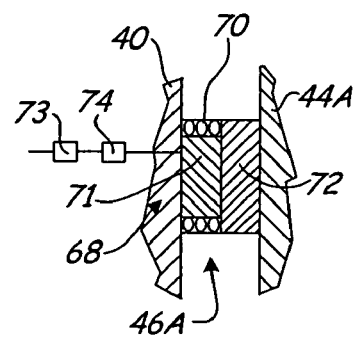
FIG. 4C shows a broken out view of a third embodiment of the process transmitter of FIG. 3 in which the mechanical integrity sensor comprises an inductive proximity sensor.

FIG. 4C shows a close-up view of another embodiment of mechanical integrity sensor 46A as positioned between cover 44A and circuitry 40. In a third embodiment, mechanical integrity sensor 46A comprises inductive proximity sensor 68 including coil 70, core 71 and permeable material 72. Additionally, sensor 46A comprises oscillator 73 and signal level detector 74, which can be included in circuitry 40. Sensor 46A measures the permeability of material 72. Coil 70 is connected to circuitry 40 and is wound around core 71, which is attached to circuitry 40. Current generated from oscillator 73 is passed through the loops of coil 70 to generate a magnetic field. Core 71 comprises a ferrite material that is inserted into the loops of coil 70 such that an eddy current is produced in core 70 by the magnetic field. Signal level detector 74 senses the eddy current level in core 71, which is a product of its permeability. Permeable material 72 is positioned on cover 44A such that when cover 44A is properly threaded with housing 38, permeable material 72 aligns with core 71. As cover 44A is brought closer to housing 38, permeable material 72 is brought closer to core 71 thereby producing eddy current losses in permeable material 72, while reducing the amplitude of oscillation of the eddy current in core 71. Signal level detector 74 detects a change in the eddy current in core 71 and relays the information to circuitry 40 whereby calculations regarding the proximity of cover 44A can be carried out. Transmitter circuitry 40 is programmed with pre-established values for the permeability of core 71 both for when permeable material 72 is adjacent to core 71 and when permeable material 72 is not adjacent to core 71. Thus, the permeability detected by signal level detector 74 can be compared to the programmed, pre-established levels to determine if cover 44A is properly threaded with housing 38A. If circuitry 40 determines an incorrect match, an audio or visual alarm can be annunciated to a user either at control room 16 or a local LCD display in circuitry 40.

Figure 4D:
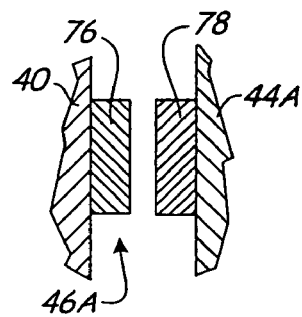
FIG. 4D shows a broken out view of a fourth embodiment of the process transmitter of FIG. 3 in which the mechanical integrity sensor comprises an optical sensor.

FIG. 4D shows a close-up view of another embodiment of mechanical integrity sensor 46A as positioned between cover 44A and circuitry 40. In a fourth embodiment, mechanical integrity sensor 46A comprises optical sensor 76 and target 78. Optical sensor 76 is positioned on circuitry 40 and detects objects by emitting light waves that optically reflect from an opposing surface such as target 78. Target 78 is positioned on cover 44A and reflects the light wave emitted from sensor 76 back toward sensor 76. A proper circuit is thereby formed only when detector 78 is correctly aligned with sensor 76 such that the light wave will reflect back toward sensor 76, which is setup to occur when cover 44A is properly threaded onto housing 38. Target 78 can comprise any shape or material that will reflect sufficient light to register with sensor 76. Thus, cover 44A alone can be detected, but target 78 can be added to enhance the repeatability of the measurement. Target 78 comprises a material that increases the reflectivity of cover 44A, such as a mirror. When sensor 76 is able to detect the reflected light waves a signal can be sent to circuitry 40 where additional circuitry can be located to perform analysis of the output signal of sensor 76 to determine the presence or position of cover 44A. If circuitry 40 is unable to detect an output signal from sensor 76, target 78 is not properly aligned with sensor 76, which is an indication that cover 44A is improperly seated or missing. As such, an audio or visual alarm can be annunciated to a user either at control room 16 or a local LCD display in circuitry 40.

Figure 4E:
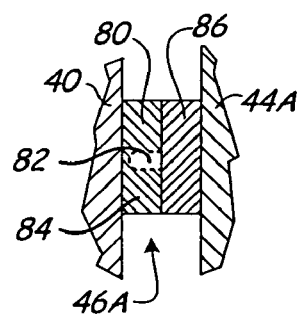
FIG. 4E shows a broken out view of a fifth embodiment of the process transmitter of FIG. 3 in which the mechanical integrity sensor comprises a mechanical limit switch.

FIG. 4E shows a close-up view of another embodiment of mechanical integrity sensor 46A as positioned between cover 44A and circuitry 40. In a fifth embodiment, mechanical integrity sensor 46A comprises mechanical limit switch 80. Mechanical limit switch 80 includes detent 82, which extends from base 84 in an untripped state, and is positioned on circuitry 40. Stud 86 is positioned on cover 44A such that when cover 44A is properly threaded with housing 38 stud 86 will depress detent 82, thereby tripping sensor 80. In the untripped state, switch 80 produces no signal because detent 82 extends and a circuit between detent 82 and base 84 is opened up. When detent 82 is depressed into base 84, the circuit is closed such that a signal is produced and can be relayed to circuitry 40. The circuit will only be closed when detent 82 is fully depressed such as when cover 44A is fully threaded with housing 38. Any mechanical force can be used to fully depress detent 82 such that cover 44A can simply be used as the trip for switch 80. However, an additional feature such as stud 86 can be added to cover 44A to increase the accuracy in depressing detent 82. For example, stud 86 reduces the surface area of cover 44A capable of depressing detent 82 when cover 44A advances toward base 84 as it is being threaded onto housing 38. Thus, sensor 80 will only be tripped when cover 44A is properly threaded onto housing 38 and not misaligned due to improper threading. In such an embodiment, base 84 is spaced back from a fully threaded cover 44A by a distance approximately equal to the depth of stud 86, and stud 86 has a surface area equal to or smaller than that of the surface area of detent 82. When switch 80 is tripped, a signal is relayed to circuitry 40 where additional circuitry can be located to perform analysis of the output signal of switch 80 to determine the presence or position of cover 44A. In one embodiment, a digital signal is produced such that if circuitry 40 is unable to detect an output signal from switch 80 it is an indication that cover 44A is either improperly seated or missing. In another embodiment, an analog signal is produced such that circuitry 40 can distinguish between a missing cover (when there is no signal) and an improperly seated cover (when there is a weak signal). As in other embodiments, circuitry 40 stores predetermined proximity values corresponding to when cover 44A is fully threaded. As such, an audio or visual alarm can be annunciated to a user either at control room 16 or a local LCD display in circuitry 40 when switch 80 indicates that cover 44A is missing or askew.

Figure 4F:
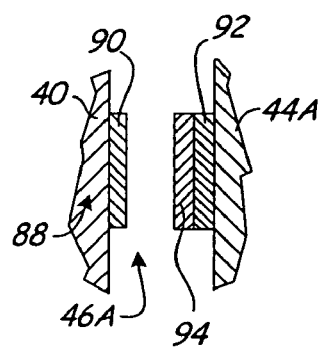
FIG. 4F shows a broken out view of a sixth embodiment of the process transmitter of FIG. 3 in which the mechanical integrity sensor comprises a capacitive proximity sensor.

FIG. 4F shows a close-up view of another embodiment of mechanical integrity sensor 46A as positioned between cover 44A and circuitry 40. In a sixth embodiment, mechanical integrity sensor 46A comprises capacitive proximity sensor 88. Capacitive proximity sensor 88 comprises first capacitor plate 90 and second capacitor plate 92, between which the capacitance can be measured in order to sense the distance between cover 44A and circuitry 40. First capacitor plate 90 is positioned on circuitry 40 and second capacitor plate 90 is positioned on cover 44A. An electrostatic field is generated between first plate 90 and second plate 92 by placing a voltage across plate 90 and plate 92, which can be generated using circuitry 40. The capacitance of sensor 88 is a function of the distance between plates 90 and 92. Circuitry 40 can be programmed to store values for the capacitance between plates 90 and 92 when cover 44A is properly threaded onto housing 38 and to perform calculations to determine the value of the actual capacitance between plates 90 and 92. Thus, a comparative analysis of the two values can be performed to determine if the measured capacitance matches the desired capacitance such that the position of cover 44A can be determined. Circuitry 40 includes other components to sense the capacitance across plates 90 and 92 such as an oscillator, a signal rectifier, a filter circuit and an output circuit. If circuitry 40 determines that the stored value and the measured values do not match, an audio or visual alarm can be annunciated to a user either at control room 16 or at local an LCD display on circuitry 40.

First capacitor plate 90 and second capacitor plate 92 can be comprised of any suitable material for functioning as capacitors such as copper. Furthermore, the capacitance between the plates can be controlled in order to give more accurate measurements by placing a dielectric material between plate 90 and plate 92. For example, dielectric material 94 can be placed on second capacitor plate 92 such that when cover 44A is installed properly, the capacitance between plates 90 and 92 will be greater than if no dielectric were between the plates excepting air. This increases the difference between the capacitance measurement when cover 44A is installed versus when it is not such that the distinction is made clearer and can be better evaluated by circuitry 40. Additional factors can be varied to increase the target capacitance value, such as decreasing the distance between plates 90 and 92, increasing the plate area, or using a dielectric material with a larger dielectric constant. In another embodiment of the present invention, a mechanical integrity sensor comprising a capacitive proximity sensor can be produced using the components of transmitter 12.

Figure 5:
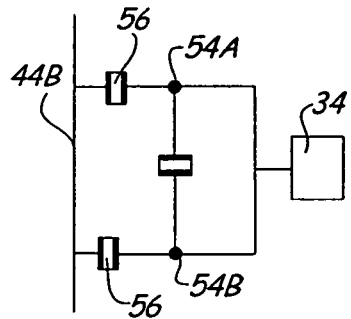
FIG. 5 shows a circuit equivalent of another embodiment of a capacitive mechanical integrity sensor used in FIG. 3.

FIG. 5 shows a circuit diagram of cover 44B and terminal screws 54A and 54B, as called out in FIG. 3 at detail B. In another embodiment of the invention, terminal screws 54A and 54B are used as capacitive probes to sense the proximity of cover 44B. A voltage generated from circuitry 40 is placed across terminal screws 54A and 54B in order to produce an electrostatic field between the screws. When cover 44B is not in place, terminal screws 54A and 54B will produce a capacitance between each other, which can be sensed and measured by electronics 40. As cover 44B is threaded onto housing 38, an additional capacitance is sensed between each screw 54A and 54B and cover 44B, in addition to the capacitance between screws 54A and 54B. As cover 44B gets closer to screws 54A and 54B the capacitance increases. Additionally, sensor material 56 is placed between cover 44B and screws 54A and 54B to increase the capacitance. As such, in one embodiment, sensor material 56 comprises a dielectric material. As in other embodiments, circuitry 40 can be programmed with predetermined values for the capacitance when cover 44B is fully installed. When a capacitance less than the value for a fully threaded cover 44B is measured, an audio or visual alarm can be annunciated to a user either at control room 16 or at local an LCD display on circuitry 40.

FIGS. 4A-4F and FIG. 5 show various embodiments of mechanical integrity sensors used to determine the proximity of covers 44A and 44B, however the sensors can be used to determine the proximity of various other mounting components such as flange 24, flange adapters 28 or sensor module 30. Proximity sensor 46C is placed between housing 38 and sensor module 30 to sense and annunciate proper installation of this assembly when connected with circuitry 40. For example, in one embodiment, sensor module 30 can be provided with timing marks or other features that can be sensed by sensor 46C to detect proper orientation of housing 38. In addition, mechanical integrity sensors can be placed within transmitter 12 to sense material properties of mounting components. For example, mechanical integrity sensors 52A and 52B are placed between transmitter flange 33 and process flange 24.

Figure 6:
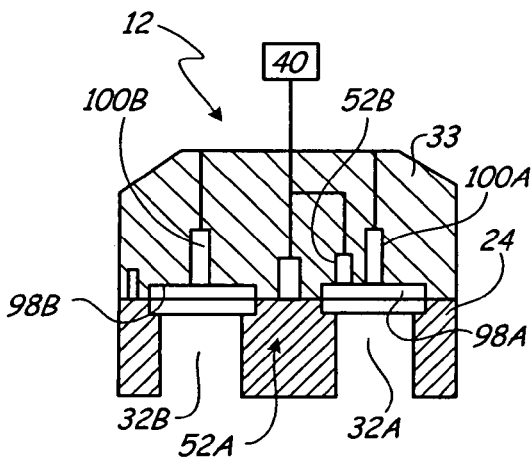
FIG. 6 shows a partial cross section of an assembled process transmitter of FIG. 2 showing various mechanical integrity sensors positioned within a transmitter flange and a process flange.

FIG. 6 shows a cross sectional view of an assembled process transmitter 12 as taken along section 6-6 of FIG. 2. FIG. 6 shows a view looking into a side of process flange 24 and transmitter flange 33. Process transmitter 12 includes transmitter flange 33 to which is connected process flange 24. Transmitter flange 33 includes process diaphragms 98A and 98B, that are positioned above bores 32A and 32B of process flange 24, respectively. Process flange 24 interacts with process fluid of, for example, pipeline 14 such that process fluid freely enters bores 32A and 32B. Diaphragms 98A and 98B interact with the process fluid and deflect based upon the pressure of the process fluid. The pressure of the process fluid is transferred to sensor module 30 through a fill fluid present in passageways 100A and 100B of transmitter flange 33. Sensor module 30 is thereby able to generate a process variable signal that is communicated to transmitter circuitry 40 whereby the signal can be processed.

It is important that both process flange 24 and diaphragms 98A and 98B be comprised of materials capable of withstanding contact with the process fluid. Thus, depending on the application, each transmitter can be customized with a different grade material for flange 24 and diaphragms 98A and 98B. For example, process flanges are typically made of such materials as stainless steel, carbon steel, Hastelloy, or Monel, each having varying properties that make them uniquely suited for operating in different applications. Therefore, it is advantageous to use the best-suited material for each application. Many of these materials have similar appearances that are difficult to distinguish by visual inspection, which can sometimes lead to the installation of a diaphragm or flange being comprised of an improper material. Material can also be mis-marked. Needless to say, process transmitters having components with materials unsuited for a specific application can have considerable safety and reliability risks. For example, improperly outfitted transmitters can become corroded, embrittled, or weakened much faster than a properly outfitted transmitter, which leads to premature failure of the parts. Therefore, process transmitter 12 is equipped with mechanical integrity sensors 52A and 52B to verify the material of flange 24 and diaphragms 98A and 98B such that erroneous use of an improperly outfitted process transmitter can be easily detected. Mechanical integrity sensor 52A verifies material properties of process flange 24 and mechanical integrity sensor 52B verifies material properties of diaphragm 98A.

Figure 7:
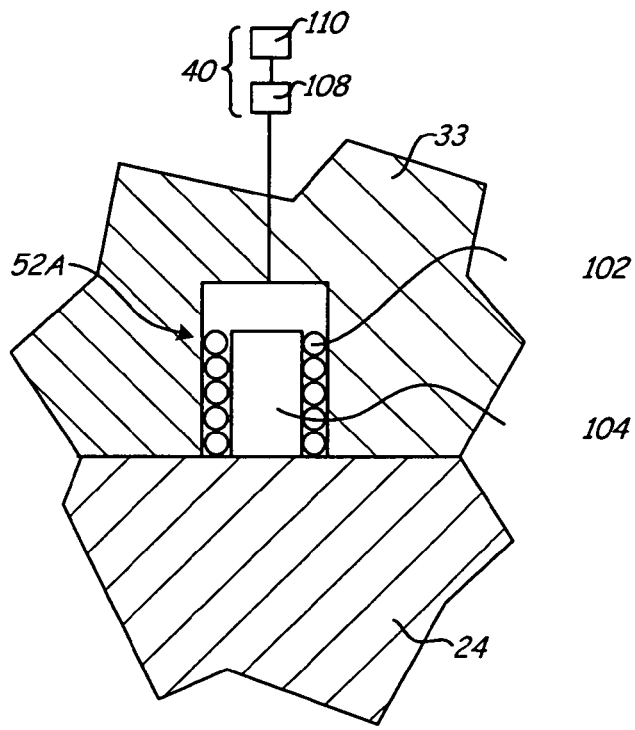
FIG. 7 shows one embodiment of a mechanical integrity sensor of FIG. 6.

FIG. 7 shows one embodiment of mechanical integrity sensor 52A positioned within transmitter flange 33 and used to detect material properties of process flange 24. In one embodiment, mechanical integrity sensor 52A comprises a material verification sensor such as an inductive permeability sensor. Additionally, in one embodiment, mechanical integrity sensor 52B is of similar construction to mechanical integrity sensor 52A. Sensor 52A comprises coil 102 and core 104, which are positioned on transmitter flange 33. Additionally, mechanical integrity sensor 52A includes oscillator 108 and signal level detector 110, which can be included in transmitter circuitry 40. Sensor 52A measures the permeability of a magnetic material and operates by generating an electromagnetic field and detecting eddy current losses generated when metal objects enter the field. Coil 102 generates a magnetic filed when a current produced by oscillator 108 is passed through the loops of coil 70, as such an associated eddy level current is produced in core 104. Signal level detector 110 senses the eddy current level in core 104, which is a product of its permeability. Process flange 24 is brought into contact with core 104 when properly installed such that the amount of eddy current in core 104 decreases, to which signal level detector 110 detects a different decrease in the amplitude of oscillation. Thus, when process flange 24 is in contact with transmitter flange 33 the amplitude of oscillation will decrease to below what it would be if flange 24 were missing. The amount of decrease depends on the permeability of the material of process flange 24. Transmitter circuitry 40 is programmed with pre-established values for the permeability of core 104 and the permeability of various process flange materials, such as stainless steel, carbon steel, Hastelloy, or Monel. Transmitter 12 can be programmed to look for or sense a decrease in the amplitude of oscillation for a process flange of a particular material, or circuitry 12 can include a user interface such that the user can select which type of material circuitry 40 should be expecting to detect. Thus, the amplitude of oscillation detected by signal level detector 110 can be compared to the programmed, pre-established levels to material of process flange 24. If circuitry 40, based on the output of sensor 52A and the stored values, determines that flange 24 produces a reduction in oscillation amplitude other than what it is programmed to look for, an audio or visual alarm can be annunciated to a user either at control room 16 or at local an LCD display on circuitry 40. Additionally, due to a change in the permeability of a material due to corrosion, sensor 52A and circuitry can be programmed to look for deviations in the amplitude of oscillation constant with know corrosion patterns.

Mechanical integrity sensors 46A-46C and 52A-52B provide a highly accurate, highly repeatable, low cost confirmation of mounting component installation and material property. Total reliance on proper marking, proper assembly, or proper installation is eliminated. The mechanical integrity sensors are particularly useful when transmitters are moved around and reinstalled with scavenged parts. The various types of mechanical integrity sensors of the present invention can be installed between any two components of transmitter 12 to determine proper installation or to verify material composition. Transmitter 12 can be setup to perform mechanical integrity verification as a constant background operation, at regular intervals or upon user request. Also, transmitter 12 can be customized to provide different types of user annunciation, such as audible or visual and local or remote indications.

Although the present invention has been described with reference to preferred embodiments, workers skilled in the art will recognize that changes may be made in form and detail without departing from the spirit and scope of the invention.

The invention claimed is:

1. A process transmitter for measuring a process variable, the process transmitter comprising:
   a process sensor for sensing the process variable of a process fluid;
   transmitter circuitry for processing a signal from the process sensor;
   a transmitter housing for receiving the process sensor and transmitter circuitry;
   at least one transmitter mounting component for isolating the sensor or the transmitter circuitry from the process fluid or external environment; and
   a mechanical integrity sensor for validating assembly of the transmitter housing and transmitter mounting component, wherein the transmitter mounting component comprises a process flange for joining the transmitter housing with the process fluid;
   wherein the mechanical integrity sensor comprises a material verification sensor for sensing material properties of the process flange, the material verification sensor comprising an active sensor system that generates:
      an input signal corresponding to a spatial relationship between the transmitter housing and the transmitter mounting component; and
      an output signal corresponding to a change in the input signal due to a change in the spatial relationship.

2. The process transmitter for measuring a process variable of claim 1 wherein:
   the active sensor system includes an inductive proximity sensor;
   the input signal comprises an eddy current between the transmitter housing and the transmitter mounting component; and
   the change in the input signal comprises a change in an amplitude of oscillation of the eddy current due to a change in the spatial relationship.

3. A process transmitter for measuring a process variable, the process transmitter comprising:
   a process sensor for sensing the process variable of a process fluid;
   a transmitter housing for receiving the process sensor;
   a process flange for joining the transmitter housing with a process fluid source; and
   a mechanical integrity sensor for verifying material properties of the process flange.

4. The process transmitter of claim 3 wherein the mechanical integrity sensor comprises an inductive permeability sensor.

5. The process transmitter of claim 4 wherein the inductive permeability sensor comprises:
   an inductance coil for generating an electrostatic field positioned within the sensor housing adjacent a housing cover;
   a core material positioned within the inductance coil;
   an oscillator for generating an eddy current in the core; and
   a signal level detector for sensing a change in an amplitude of oscillation of the eddy current when the process flange is positioned near the core.

6. The process transmitter of claim 3 and further comprising a second material verification sensor for sensing material properties of a process diaphragm positioned within the process transmitter.

7. The process transmitter of claim 3 and further comprising transmitter circuitry including predetermined material property values for comparison to a signal generated by the mechanical integrity sensor.

8. The process transmitter of claim 7 and further comprising electronic circuitry that annunciates when the signal generated by the mechanical integrity sensor differs from a predetermined material property value.

9. A process transmitter for measuring a process variable, the process transmitter comprising:
   a process sensor for sensing the process variable of a process fluid;
   transmitter circuitry for processing a signal from the process sensor;
   a transmitter housing for receiving the process sensor and transmitter circuitry;
   at least one transmitter mounting component for isolating the sensor or the transmitter circuitry from the process fluid or external environment; and
   a mechanical integrity sensor for validating assembly of the transmitter housing and transmitter mounting component;
   wherein the mechanical integrity sensor comprises a material verification sensor for sensing a material property of the transmitter mounting component; and
   wherein the transmitter mounting component comprises a process flange for joining the transmitter housing with the process fluid.

10. The process transmitter of claim 9 wherein the transmitter circuitry includes predetermined values for comparison to a signal generated by the mechanical integrity sensor.

11. The process transmitter of claim 9 wherein the transmitter circuitry validates the sensed material property of the process flange with material property data stored in the transmitter circuitry.

12. The process transmitter of claim 9 wherein the material verification sensor comprises an inductive permeability sensor.

13. The process transmitter of claim 9 and further comprising a second material verification sensor for sensing material properties of a process diaphragm positioned within the process transmitter.

14. The process transmitter of claim 9 wherein the transmitter circuitry includes electronics that annunciate to a user output of the mechanical integrity sensor.

15. The process transmitter of claim 9 wherein the transmitter circuitry operates the mechanical integrity sensor as a continuous background operation.

16. The process transmitter of claim 9 wherein the transmitter circuitry includes a user control such that a user is able to manually initiate operation of the mechanical integrity sensor.

17. The process transmitter for measuring a process variable of claim 9 wherein the mechanical integrity sensor comprises an analog sensor.

* * * * *